United States Patent [19]

Grünewald et al.

[11] Patent Number: 4,840,648
[45] Date of Patent: Jun. 20, 1989

[54] PROCESS FOR REGENERATING ABSORBENTS CONTAINING CO2 AND COS

[75] Inventors: Gerhard Grünewald, Mainz-Gonsenheim; Manfred Kriebel, Frankfurt am Main, both of Fed. Rep. of Germany

[73] Assignees: Metallgesellschaft Aktiengesellschaft, Frankfurt am Main; Linde Aktiengesellschaft, Hollriegelskreuth, both of Fed. Rep. of Germany

[21] Appl. No.: 167,565

[22] Filed: Mar. 14, 1988

[30] Foreign Application Priority Data

Mar. 21, 1987 [DE] Fed. Rep. of Germany ....... 3709364

[51] Int. Cl.$^4$ ............................................. B01D 47/00
[52] U.S. Cl. ........................................ 55/44; 55/48; 55/53; 55/68; 55/73
[58] Field of Search ............... 55/43, 44, 68, 73, 53, 55/48

[56] References Cited

U.S. PATENT DOCUMENTS

| | | | |
|---|---|---|---|
| 3,531,917 | 10/1970 | Grünewald et al. | 55/42 |
| 3,710,546 | 1/1973 | Grünewald et al. | 55/42 |
| 4,324,567 | 4/1982 | Ranke et al. | 55/43 |
| 4,325,782 | 4/1982 | Grünewald et al. | 55/73 |
| 4,568,364 | 2/1986 | Galstaun et al. | 55/43 |

FOREIGN PATENT DOCUMENTS 1494806 7/1975 Fed. Rep. of Germany.

*Primary Examiner*—Bernard Nozick
*Attorney, Agent, or Firm*—Herbert Dubno; Jonathan Myers

[57] ABSTRACT

Two absorbent solution streams are laden with CO$_2$ and optionally with COS, which are physically dissolved. The COS content of the second absorbent solution stream is at least three times the COS content of the first absorbent solution stream. For regeneration, the first absorbent solution stream is pressure-relieved into a first pressure relief zone so as to reduce the pressure by at least 2 bars and to flash off a gas which contains CO$_2$. The second absorbent solution stream is pressure-relieved at least in part into a second pressure relief zone, which contains exchange-promoting elements. The flashed-off gas from the first pressure relief zone is passed through the second pressure relief zone in a countercurrent to the second absorbent solution stream. The second pressure relief zone is preferably disposed over the first pressure relief zone and the second absorbent solution stream flows first through the second and then through the first pressure relief zone.

4 Claims, 1 Drawing Sheet

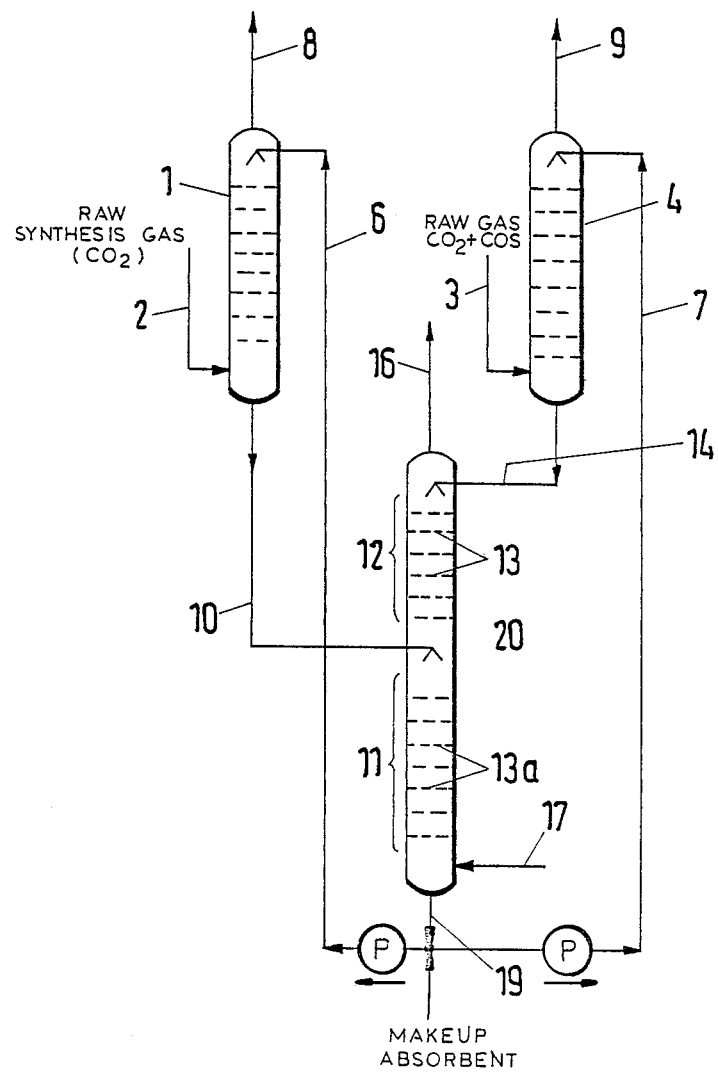

4,840,648

PROCESS FOR REGENERATING ABSORBENTS CONTAINING $CO_2$ AND COS

FIELD OF THE INVENTION

Our present invention relates to a process for regenerating two absorbent solution streams which are laden with physically dissolved carbon dioxide and carbon oxysulfide wherein the absorbent solution strems are pressure relieved for regeneration.

BACKGROUND OF THE INVENTION

It has been known for a long time that gases can be purified by a treatment with physically acting absorbent solutions and that particularly $H_2S$ and COS, as well as $CO_2$, can be removed from such gases.

Processes of that kind have been described in German Patent No. 1,494,606 and in U.S. Pats. Nos. 3,531,917 and 3,710,546.

It is also known that the laden absorbent solution can be regenerated by pressure-relieving, heating or stripping treatments or by a combination thereof. Suitable physically acting absorbent solutions are methanol and N-methylpyrrolidone (NMP).

OBJECT OF THE INVENTION

It is an object of the invention to effect a simple regeneration of absorbent solution streams which have different loadings, even if they contain carbon oxysulfide which is known to be removable only with difficulty.

SUMMARY OF THE INVENTION

This object is accomplished in accordance with the invention in that a first such absorbent solution stream is pressure-relieved into a first pressure relief zone to effect a pressure reduction by at least 2 bars, whereby a $CO_2$-containing gas is liberated, the second absorbent solution stream is at least partly pressure-relieved into a second pressure relief zone which contains material-exchange-promoting elements (e.g. baffles, plates, bottoms or packing elements), the gas liberated in the first pressure-relief zone is passed through the second pressure relief zone in a countercurrent or counterflow to the second absorbent solution stream, the COS content per $m^3$ of the second absorbent solution stream is at least three times the corresponding COS content of the first absorbent solution stream and a gas which contains $CO_2$ and COS is withdrawn from the top of the second pressure relief zone.

In the process in accordance with the invention the $CO_2$-containing gas which has been liberated in the first pressure relief zone is used in the second pressure relief zone as a stripping gas for stripping almost all COS from the second absorbent solution stream. As a result, COS is removed from the second absorbent solution stream to such a high degree that an aftertreatment will not be required in most cases.

If $CO_2$ is not flashed off to a sufficient high degree as the result of the pressure relief of the first absorbent solution stream, the removal of additional $CO_2$ can be promoted by means of an ancillary stripping gas, which is supplied to the first pressure relief zone from the exterior.

In that case the ancillary stripping gas is passed together with the liberated first-zone gas also through the second pressure relief zone because this stripping gas as well as the $CO_2$ which has been stripped off in the first zone constitute stripping fluids for removing COS.

The two absorbent solution streams having different loadings may come from two different scrubbing columns in which different gases are treated to completely or sufficiently remove $CO_2$ and COS and possibly also $H_2S$. Alternatively, the two laden absorbent solutions streams may come from different process stages for treating one and the same gas.

BRIEF DESCRIPTION OF THE DRAWING

The above and other objects, features and advantages of our invention will become more readily apparent from the following description, reference being made to the accompanying highly diagrammatic drawing in which the sole FIGURE of which is a flow diagram illustrating the process.

SPECIFIC DESCRIPTION AND EXAMPLE

A first scrubbing tower 1 is supplied through line 2 with a first raw gas, which contains $CO_2$ and may have a low COS content. A second scrubbing tower 4 is supplied through line 3 with a second raw gas, which contains $CO_2$ and has a higher COS content as the first raw gas. A physically acting absorbent solution is supplied in line 6 to the first scrubbing tower and in line 7 to the second scrubbing tower. The treated gases are withdrawn in line 8 and 9.

The raw gases in lines 2 and 3 may consist, e.g., of synthesis gases having $H_2$ and CO as their main components. The first raw gas may contain more $CO_2$ and less COS than the second raw gas flowing in line 3. The COS content of the first raw gas lies in the range from 0 to 50 ppm in most cases and the COS content of the second raw gas is in the range from 20 to 2000 ppm.

A pressure from about 6 to 100 bars, in most cases from 10 to 80 bars, is usually maintained in the two scrubbing towers and temperatures in the range from $+60°$ C. to $-80°$ C. are maintained in the two scrubbing towers and are selected in dependence on the absorbent solution which is employed, preferably NMP.

The first absorbent solution stream leaving the first scrubbing tower 1 flows in line 10 to the first pressure relief zone 11 of a regenerating column 20. The column 20 has in its upper portion a second pressure relief zone, which contains exchange-promoting elements 13, such as gas- and liquid-permeable plates or packing elements, which are known per se. The second absorbent solution stream leaving the second scrubbing tower 4 is supplied in line 14 to the second pressure relief zone 12 and is pressure-relieved into the latter.

The pressure relief of the absorbent solution stream from line 10 results in the formation of a liberated gas which has a high $CO_2$ content. That liberated gas rises in the second pressure relief zone 12 in a countercurrent to the second scrubbing zone, which has been supplied in line 14, and the flashed-off gas strips of all or almost all of the COS contained in that solution. A liberated gas which contains COS and $CO_2$ is withdrawn in line 16 from the top of the regenerating column 20.

The regeneration of the two absorbent solutions and particularly the removal of $CO_2$ therefrom can be improved further in that an ancillary stripping gas consisting, e.g. of nitrogen is supplied to the column 20 at its lower end through line 17. That stripping gas rises in the column 20 in a countercurrent to the absorbent solutions and strips $CO_2$ from the absorbent solution in the first pressure relief zone 11 and strips additional COS and possibly also $CO_2$ from the absorbent solution in the second pressure relief zone 12. The stripping gas is contained in the mixed gases which are withdrawn in line 16. If no stripping gas is supplied at line 17, the exchange-promoting (packing) elements 13a in the first pressure relief zone 11 may be omitted.

The action of the exchange-promoting elements 13 in the first pressure relief zone 12 should be equivalent to at least one theoretical plate. The temperature maintained in the regenerating column 20 wil lie in most cases in the range from $+50°$ C. to $-75°$ C. and will depend on the temperatures of the absorbent solution streams which are supplied. The pressure maintained in the column 20 amounts usually to 1 to 5 bars and is lower by at least 2 bars than the pressure in the scrubbing towers. For this reason the regenerated absorbent solution must be supplied to the scrubbing towers 1 and 4 via lines 6 and 7 by means of pumps P.

EXAMPLE

In a system corresponding to that shown on the drawing, more or less desulfurized gases containing $H_2$ and CO as their main components are conducted in lines 2 and 3. The rates of said gases and their contents of $CO_2$ and COS are as follows:

|  | Line 2 | Line 3 |
| --- | --- | --- |
| rate (kilomoles/h) | 6,700 | 4,465 |
| $CO_2$ (mole percent) | 41 | 15 |
| COS (ppm) | 5 | 100 |

In the scrubbing towers 1 and 4, the gases are treated with NMP at a temperature from about 10° to 20° C. Absorbent solution at a rate of 740 m³/h from the first scrubbing tower 1 and absorbent solution at a rate of 450 m³/h from the second scrubbing tower 4 are supplied to the regenerating column 20. Each of the purified gases flowing in lines 8 and 9 contains 3% by volume $CO_2$ and about 1 ppm COS.

The absorbent solution streams in lines 10 and 14 have the following loadings and temperatures:

A pressure of about 20 bar is maintained in the regenerating column 1, in which a stripping gas is not used so that line 17 and the exchange-promoting elements 13a are omitted. Flashed-off gas consisting almost entirely of $CO_2$ flows at a rate of 2627 kilomoles per hour from the first pressure relief zone 11 to the second pressure relief zone 12. An exhaust gas which also consists mainly of $CO_2$ and contains about 148 ppm COS is withdrawn in line 16 at a rate of about 3180 kilomoles per hour.

We claim:

1. A process for regenerating two absorbent solution streams laden with physically dissolved carbon dioxide and carbon oxysulfide, said two absorbent streams coming from two scrubbing zones for scrubbing gases, comprising the steps of:
    (a) pressure-relieving a first absorbent solution having carbon dioxide physically dissolved therein, into a first pressure relief zone to effect a pressure reduction of at least two bars and liberate a $CO_2$-containing gas;
    (b) pressure-relieving a second absorbent solution having carbon dioxide and a concentration of carbon oxysulfide at least three times that of the first absorbent solution in a second pressure relief zone containing material-exchange-promoting elements;
    (c) passing said $CO_2$-containing gas liberated in said first pressure relief zone upwards through said second pressure relief zone in counterflow to the second absorbent solution in said second pressure relief zone, whereby a gaseous mixture containing $CO_2$ and COS is formed in said second pressure relief zone, and said gaseous mixture is withdrawn from the top of said second pressure relief zone; said first pressure relief zone is the lower part of an upright regeneration column and said second pressure relief zone is the upper part of said regeneration column, said second pressure relief zone is disposed directly above the first pressure relief zone and communicates directly therewith, and said second absorbent solution is passed downwardly into and through said first pressure relief zone from said second pressure relief zone, regenerated absorbent solution is withdrawn from the bottom of said regeneration column and two partial streams of said regenerated solution are fed into said two scrubbing zones.

2. The process defined in claim 1, further comprising the step of maintaining a pressure of 1 to 5 bars in said pressure relief zones during expansion of the absorbent solutions therein.

3. The process defined in claim 1, further comprising the step of passing a stripping gas through said pressure relief zones in counterflow to the first and second absorbent solutions by feeding said stripping gas from the exterior into said first pressure-relief zone.

4. The process defined in claim 3, further comprising the step of maintaining a pressure of 1 to 5 bars in said pressure relief zones during expansion of the absorbent solutions therein.

* * * * *